United States Patent
Urban et al.

(10) Patent No.: US 6,832,414 B2
(45) Date of Patent: Dec. 21, 2004

(54) APPARATUS AND METHOD FOR CLAMPING CABLE

(75) Inventors: Blake R. Urban, Lenior, NC (US);
Isaac D. M. White, Orlando, FL (US);
James E. Dickens, Ocoee, FL (US);
Kevin Forsberg, Orlando, FL (US);
Charles Sawyer, Orlando, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/307,003

(22) Filed: Nov. 30, 2002

(65) Prior Publication Data

US 2004/0103501 A1 Jun. 3, 2004

(51) Int. Cl.[7] .............................. F16G 11/04; F16G 11/00
(52) U.S. Cl. ................. 24/115 L; 24/136 R; 24/115 M
(58) Field of Search .......................... 24/115 A, 115 L, 24/115 M, 115 R, 136 K, 136 R; 439/863; 403/409.1

(56) References Cited

U.S. PATENT DOCUMENTS

| | | | | |
|---|---|---|---|---|
| 198,527 A | * | 12/1877 | Wethered ...................... 188/64 |
| 671,074 A | * | 4/1901 | White ........................ 24/136 K |
| 1,345,673 A | * | 7/1920 | Hills ............................ 188/64 |
| 1,832,388 A | * | 11/1931 | Heisser ...................... 24/136 A |
| 1,903,000 A | * | 3/1933 | Jannopoulo ................ 24/115 R |
| 2,291,903 A | | 8/1942 | Kemper |
| 2,412,097 A | | 12/1946 | Russell |
| 2,529,327 A | | 11/1950 | Carlson |
| 2,544,086 A | * | 3/1951 | Herrington ................. 24/136 A |
| 3,198,290 A | * | 8/1965 | Di Maio ..................... 24/136 A |
| 3,628,221 A | | 12/1971 | Pasbrig |
| 3,751,772 A | * | 8/1973 | Grandjanny .............. 24/115 A |
| 3,952,789 A | * | 4/1976 | Marotto .................... 160/178.2 |
| 4,180,118 A | * | 12/1979 | Vecchiarelli .............. 160/178.2 |
| 4,327,797 A | * | 5/1982 | Nakajima et al. ........ 160/178.2 |
| 4,330,906 A | * | 5/1982 | Werner ...................... 24/136 R |
| 4,337,553 A | * | 7/1982 | Fischer ........................ 24/68 R |
| 4,352,386 A | * | 10/1982 | Butler et al. .............. 24/136 A |
| 4,667,772 A | | 5/1987 | Kammerer |
| 4,719,956 A | * | 1/1988 | Valle ........................ 24/136 A |
| 4,828,210 A | | 5/1989 | Anderson |
| 4,889,320 A | | 12/1989 | Pasbrig |
| 4,935,993 A | | 6/1990 | Bree |
| 4,945,970 A | * | 8/1990 | Marocco .................. 160/178.2 |
| 5,226,620 A | | 7/1993 | Libert |
| 5,263,528 A | * | 11/1993 | Patel ......................... 24/136 A |
| 5,336,846 A | | 8/1994 | Sachs |
| 6,058,574 A | | 5/2000 | Facey |
| 6,213,188 B1 | * | 4/2001 | Huang ................. 160/178.2 R |
| 6,282,759 B1 | | 9/2001 | Czaloun |

\* cited by examiner

Primary Examiner—Robert J. Sandy
Assistant Examiner—Ruth C. Rodriguez
(74) Attorney, Agent, or Firm—Walters & Zimmerman; Geoff Sutcliffe; Jennifer Medlin

(57) ABSTRACT

An apparatus and a method are disclosed for clamping cable. The apparatus has an elongate body having an interior passage extending from a first end to a second end. An end of the cable inserts into the first end, is pushed through the interior passage, and pushed out the second end. A roller is mounted within the interior passage, and the cable rolls along the roller as the cable is pushed through the interior passage. A wedge slides within the body to a position adjacent the roller, and the wedge clamps the cable between the roller and the wedge. Tension in the cable in one direction causes the wedge to slide away from the roller, thus permitting the apparatus to be slid along the cable to a desired location. Tension in the opposite direction, however, causes the wedge to slide to the roller, thus clamping the cable within the apparatus.

13 Claims, 5 Drawing Sheets

APPARATUS AND METHOD FOR CLAMPING CABLE

BACKGROUND OF THE INVENTION

1. Field of the Invention

This invention generally relates to supports and, more particularly, to cable suspension clamps.

2. Description of the Related Art

"Aerial Service Wire" provides telephone service to a customer. Aerial service wire is telephone cable that spans from a utility pole to the customer's premises. Aerial service wire, however, may also run underground to the customer's premises. When aerial service wire spans from a utility pole to the customer's premises, the aerial service wire is clamped and hung from a terminal at the utility pole.

Aerial service wire, however, is very difficult to hang. Prior art aerial service wire clamps comprise three pieces. These three-piece clamps must first be assembled to clamp the aerial service wire. Assembling these prior art clamps, however, is a challenge for the technician. The technician is usually high atop a ladder at the utility pole. The technician must hold the aerial service wire with one hand, assemble the three-piece clamp with the other hand, and still maintain balance atop the ladder. This procedure is very time-consuming, thus preventing the technician from quickly resolving the problem and moving on to another customer. Should the technician drop on the three pieces, the technician wastes even more time when climbing down from the ladder to retrieve the piece. There is, accordingly, a need in the art for an apparatus and method that allows a technician to quickly and to conveniently clamp aerial service wire.

BRIEF SUMMARY OF THE INVENTION

The aforementioned problems, and other problems, are reduced by an apparatus and method for clamping cable. This invention is a single-piece clamping apparatus for various electrical conductors. This invention, in particular, is a single-piece clamping apparatus for aerial service wires. Whereas the prior art clamps had three separate pieces, the clamp of this invention has only one component. A technician is able to hold the aerial service wire in one hand, and then slide this invention over the cable using the other hand. The apparatus of this invention, in fact, may be installed on the cable while the technician is on the ground. When the technician then climbs the ladder, this invention is quickly and easily slid to any desired location along the cable. Because this invention allows the technician to quickly and to easily hang cables, such as aerial service wire, the technician is able to more quickly complete the customer's repair. This invention is also easier to adjust over time. As the cable ages, the cable stretches in length and sags. The cable will also sag in the hot summer sun. A technician, then, often will tighten the cable clamp to remove this sag. Because this invention is quickly and easily slid to any desired location along the cable, the technician easily manipulates this invention to remove sag in the cable. This invention thus allows the technician to more quickly complete repairs and, this invention saves money by permitting the technician to complete more repairs per week.

One embodiment of this invention describes an apparatus for clamping cable. This apparatus comprises an elongate body having a first end, a second end, and an interior passage extending from the first end to the second end. The interior passage has an inner wall defining a longitudinal axis extending from the first end to the second end. The interior passage is open at the first end and is open at the second end, such that an end of the cable is inserted into the first end, pushed through the interior passage, and pushed out the second end. A roller mounts within the interior passage, and the cable rolls along the roller as the cable is pushed through the interior passage. A wedge slides within the body to a position adjacent the roller, and the wedge clamps the cable between the roller and the wedge. Tension in the cable in one direction causes the wedge to slide away from the roller, thus permitting the apparatus to be slid along the cable to a desired location. Tension in the cable in the opposite direction, however, causes the wedge to slide to the roller, thus clamping the cable within the apparatus.

Another embodiment of this invention describes a method for clamping a cable. An end of the cable is inserted into a single piece clamp. The single piece clamp comprises a roller and a sliding wedge. The single piece clamp is hung to create tension in the cable, and the tension causes the wedge to slide to a position adjacent the roller and to clamp the cable between the roller and the wedge.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

Figure 1:
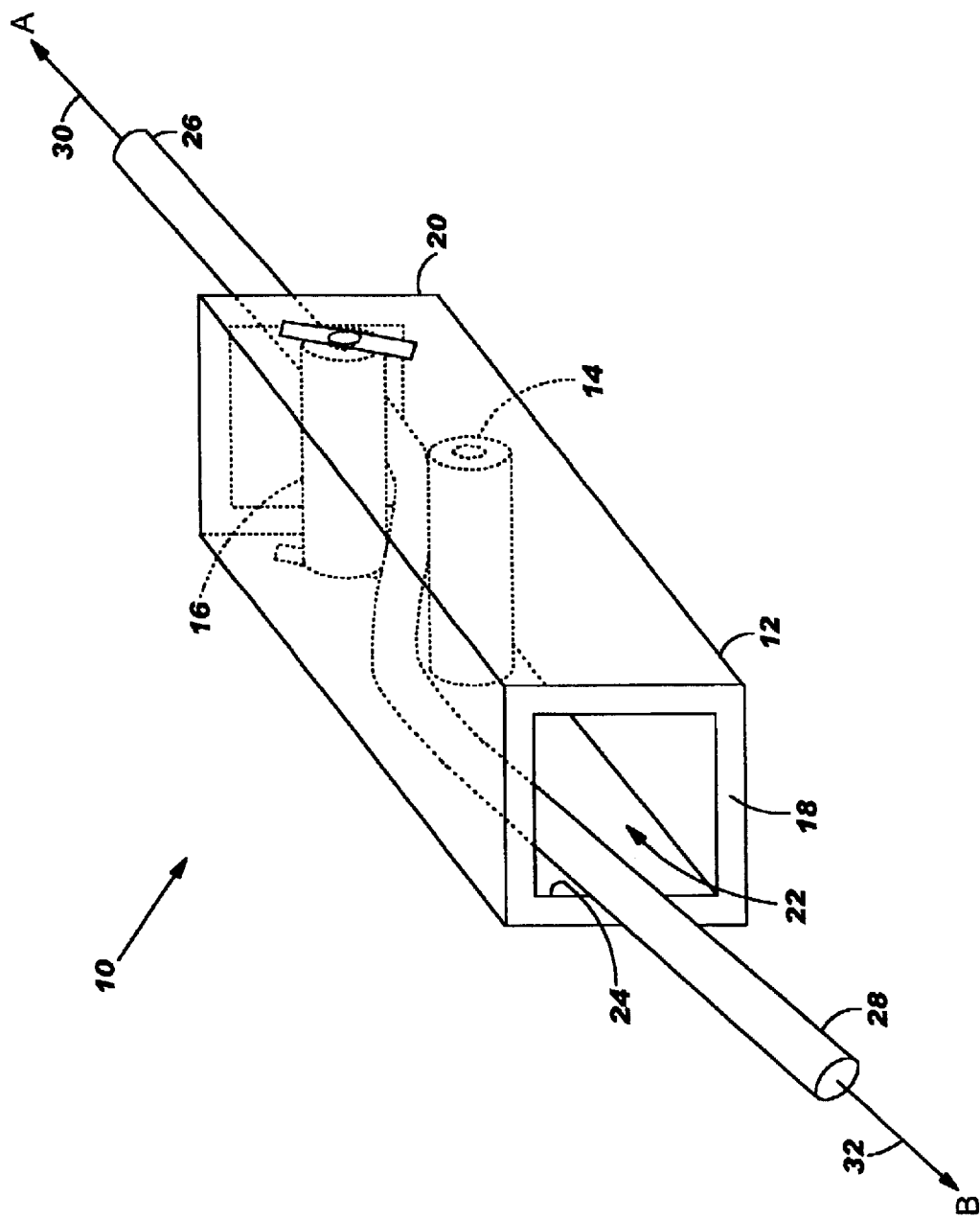
FIG. 1 is a schematic illustrating an apparatus according to this invention.

FIG. 1 is a schematic illustrating an apparatus 10 according to this invention. The apparatus 10 comprises a single, elongate body 12, a roller 14 mounted within the body 12, and a wedge 16 sliding within the body 12. The elongate body 12 has a first end 18, a second end 20, and an interior passage 22 extending from the first end 18 to the second end 20. The interior passage 22 has an inner wall 24 and is open at the first end 18 and at the second end 20. An end 26 of a cable 28 is inserted into the first end 18, pushed through the interior passage 22, and pushed out the second end 20. The cable 28 rolls along the roller 14 as the cable is pushed through the interior passage 24. The wedge 16 slides within the body 12 to a position adjacent the roller 14. Tension in the cable 28 causes the wedge 16 to clamp the cable 28 between the roller 14 and the wedge 16. As FIG. 1 shows, tension in the direction of arrow "A" (shown as reference numeral 30) causes the wedge 16 to slide away from the roller 14, thus permitting the apparatus 10 to be slid along the cable 28 to a desired location. Tension in the direction of arrow "B" (shown as reference numeral 32), however, slides the wedge 16 to the roller 14, thus clamping the cable 28 between the roller 14 and the wedge 16.

Figure 2:
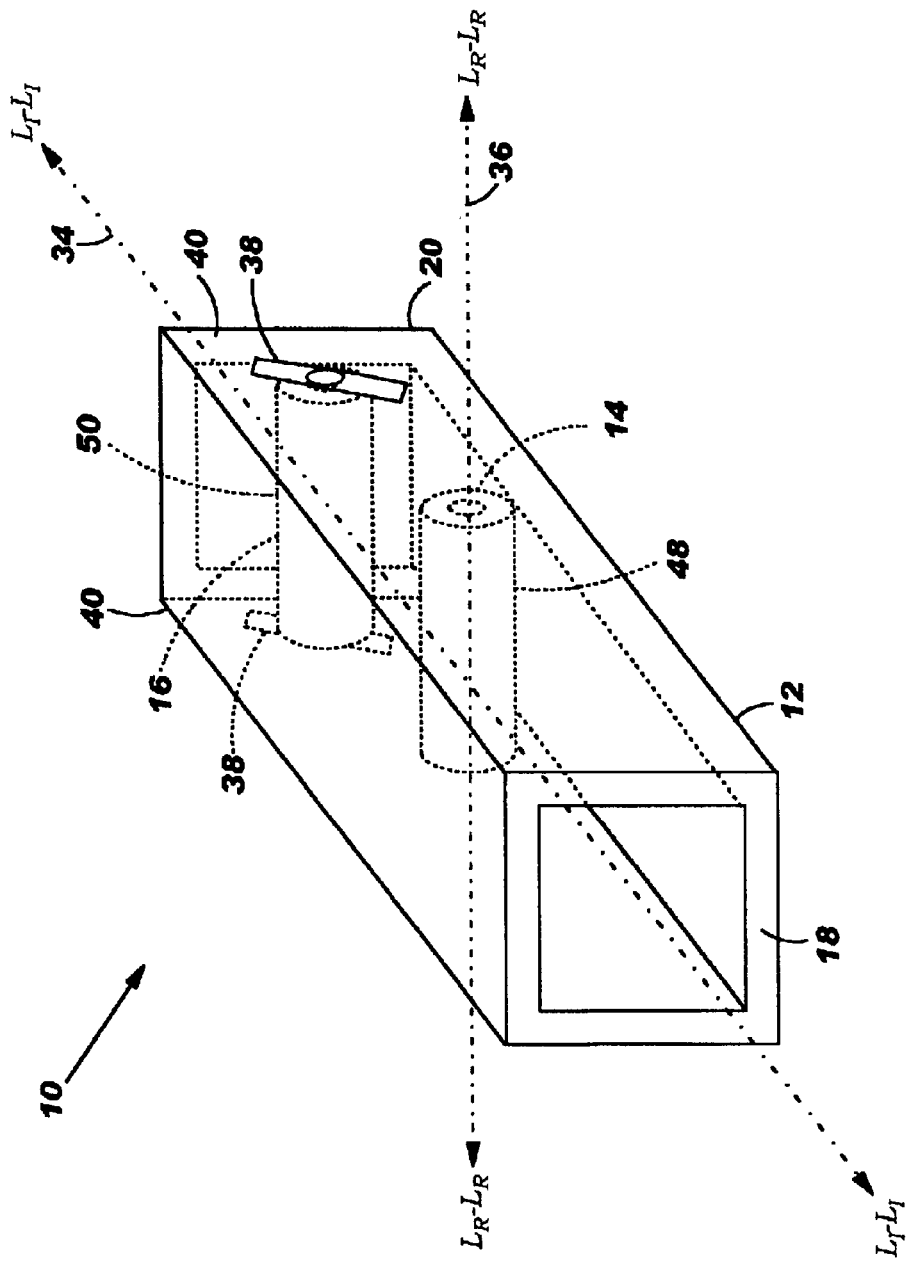
FIGS. 2 and 3 are schematics showing additional details of the apparatus 10 shown in FIG. 1.
Figure 3:
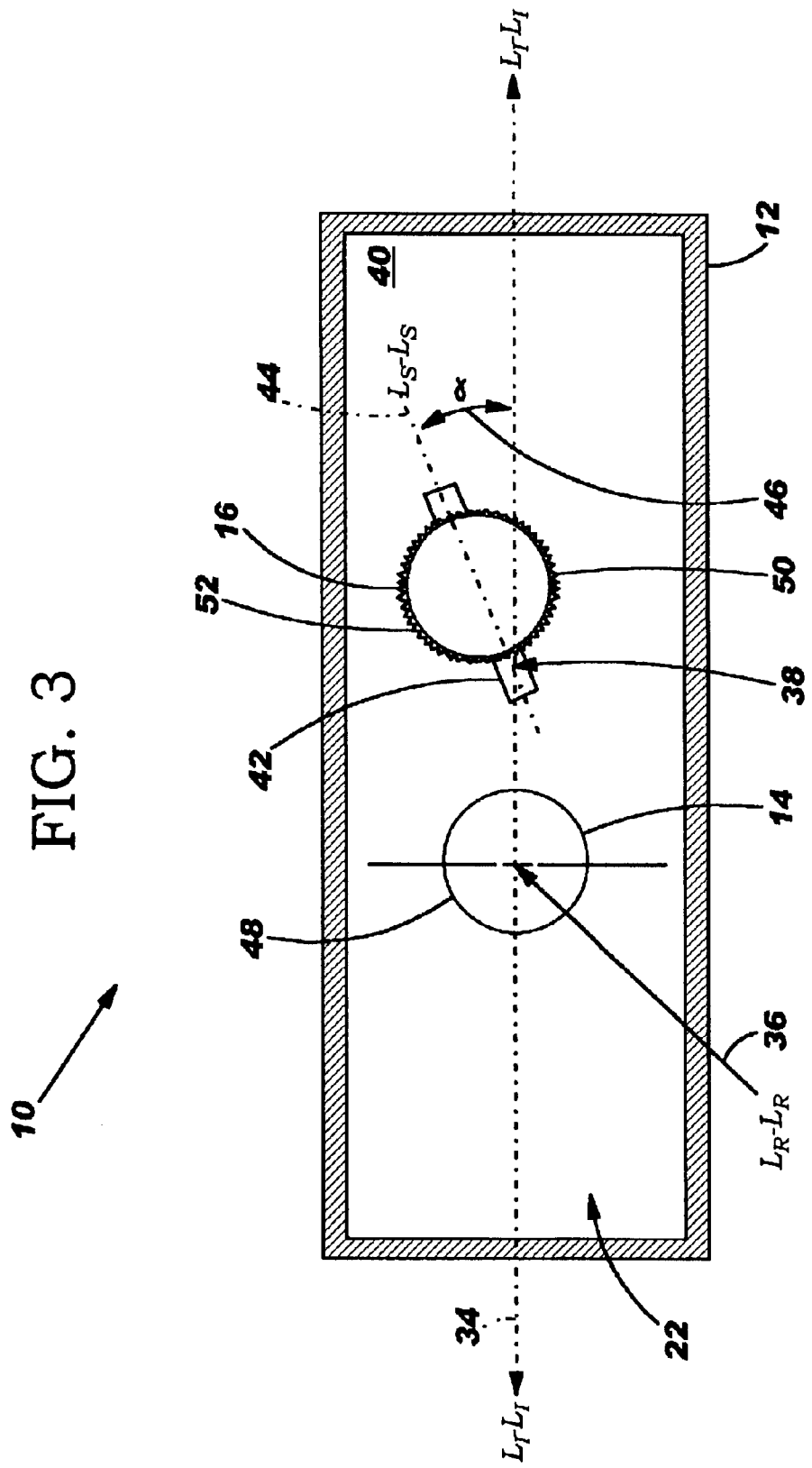

FIGS. 2 and 3 are schematics showing additional details of the apparatus 10 shown in FIG. 1. FIG. 2 is an isometric view of the apparatus 10, while FIG. 3 is a sectional view of the body 12. The interior passage 22 extends from the first end 18 to the second end 20. The inner wall 24 of the interior passage 22 defines a longitudinal axis $L_I$—$L_I$ (shown as reference numeral 34) extending from the first end 18 to the second end 20. The roller 14 rotates about an axis of rotation $L_R$—$L_R$ (shown as reference numeral 36). While the axis of rotation $L_R$—$L_R$ may have any orientation, the axis of rotation $L_R$—$L_R$ is preferably perpendicularly arranged to the longitudinal axis $L_I$—$L_I$ of the elongate body 12. The axis of rotation $L_R$—$L_R$ is also preferably aligned along the longitudinal axis $L_I$—$L_I$ of the elongate body 12.

As FIG. 3 best shows, the body 12 may also comprise at least one slot 38. The slot 40 is preferably arranged in an outer surface 40 of the body 12. The slot 38 has an outer wall 42 defining a longitudinal axis $L_S$—$L_S$ (shown as reference numeral 44). While the longitudinal axis $L_S$—$L_S$ may have any orientation, the longitudinal axis $L_S$—$L_S$ is preferably oriented at an angle α (shown as reference numeral 46) to the longitudinal axis $L_I$—$L_I$ of the elongate body 12. The wedge 16 slides along the slot 38 to a position adjacent the roller 14. The slot 38, if desired, may be positioned such that the wedge 16 abuts the roller 14. While the roller 14 may have any shape that allows the cable (shown as reference numeral 28 in FIG. 1) to roll along the roller 14, the roller 14 preferably has a cylindrical outer surface 48. The wedge 16, too, may have any shape that clamps the cable between the roller 14 and the wedge 16. The wedge 16, however, also preferably has a cylindrical outer surface 50. The wedge 16 may also have a serrated surface 52 to enhance frictional grip of the cable.

Figure 4:
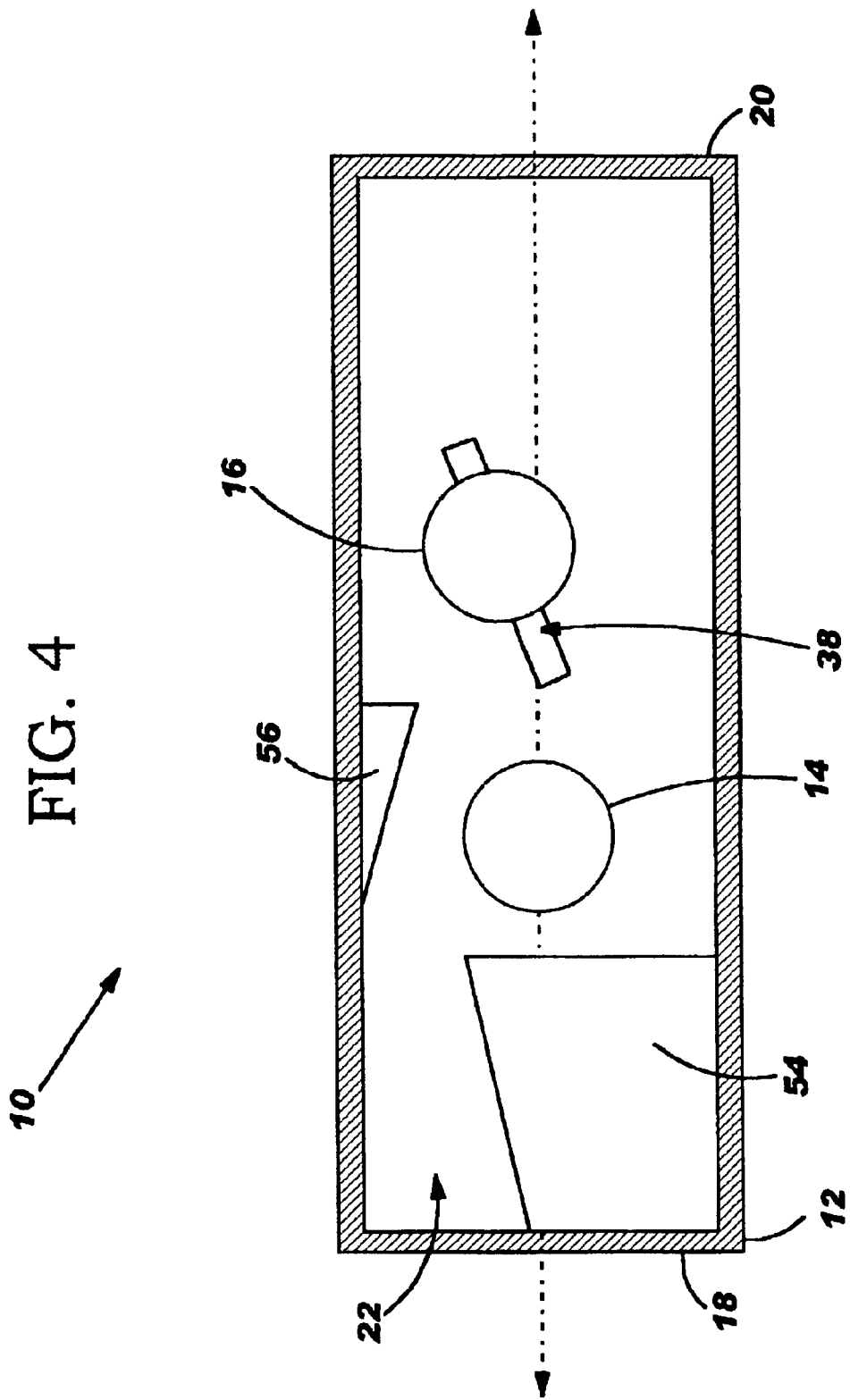
FIG. 4 is a schematic showing an alternative embodiment of the apparatus 10 according to this invention.

FIG. 4 is a schematic showing an alternative embodiment of the apparatus 10 according to this invention. Here the apparatus 10 comprises a first guide 54 to help deliver the cable (shown as reference numeral 28 in FIG. 1) to the roller 14. As the cable is inserted into the first end 18 of the interior passage 22, the first guide 54 helps deliver the end (shown as reference numeral 26 in FIG. 1) of the cable to the roller 14. Once the end of the cable rolls along the roller 14, a second guide 56 may direct the end of the cable between the roller 14 and the wedge 16.

Figure 5:
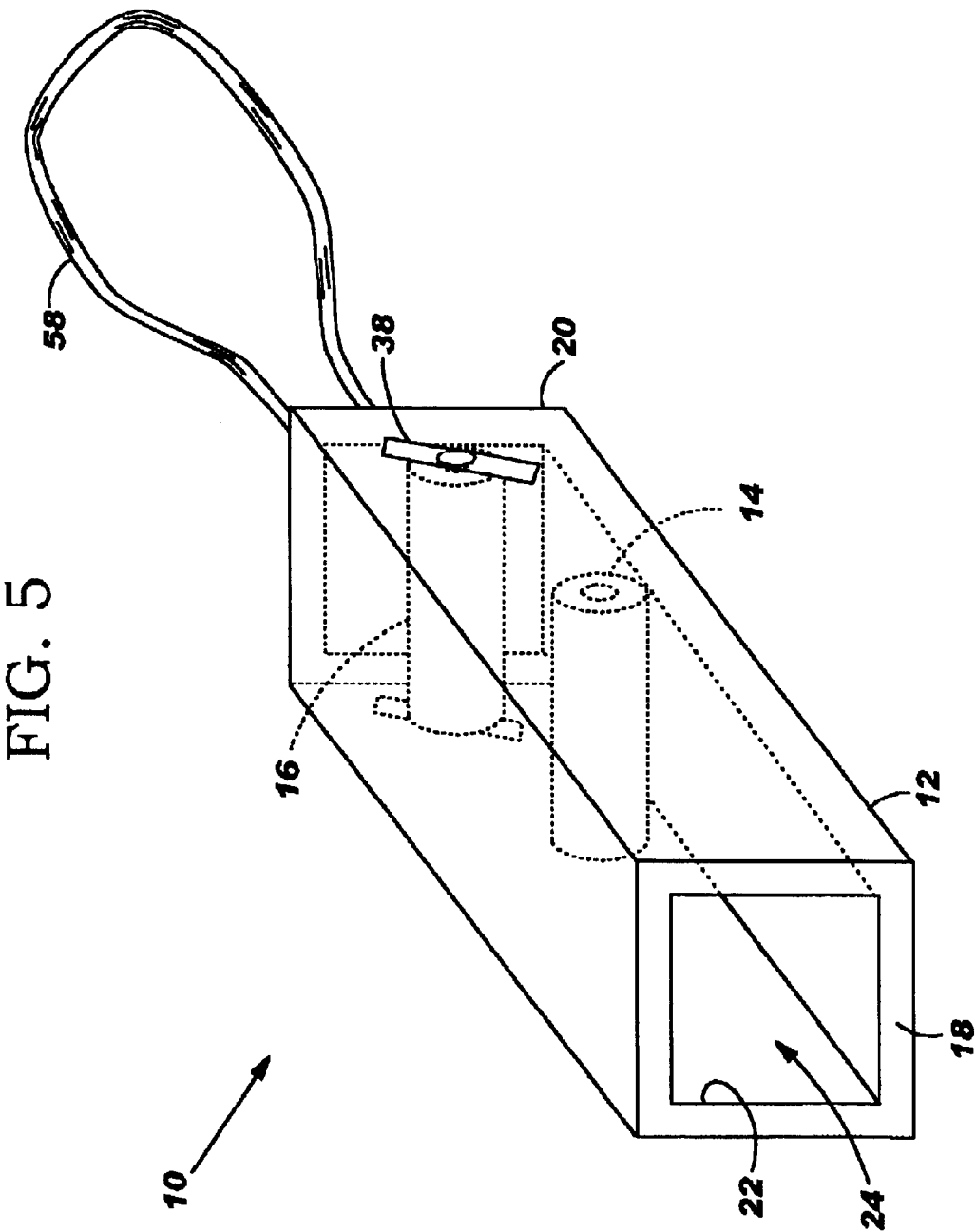
FIG. 5 is a schematic showing still another alternative embodiment of the apparatus 10 according to this invention.

FIG. 5 is a schematic showing still another alternative embodiment of the apparatus 10 according to this invention. Here the apparatus 10 comprises a hanger 58 mounted to the body 12. This hanger 58 is for hanging the apparatus 10 to create tension in the cable. When, for example, the apparatus 10 is used to clamp telephone aerial service wire, the apparatus 10 is hung from a telecommunications terminal at a utility pole. When the apparatus 10 is hung by the hanger 58, the weight of the aerial service wire creates tension in the cable (as shown by arrow "B," reference numeral 32, of FIG. 1). This tension in the aerial service wire slides the wedge 16 to the roller 14, thus clamping the aerial service wire between the roller 14 and the wedge 16.

This invention also includes a method for clamping cable. An end of the cable is inserted into a single piece clamp. The single piece clamp comprises a roller and a sliding wedge. The single piece clamp is hung to create tension in the cable, and the tension causes the wedge to slide to a position adjacent the roller and to clamp the cable between the roller and the wedge.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. An apparatus for clamping cable, comprising:

an elongate body having a first end, a second end, and an interior passage extending from the first end to the second end, the interior passage having an inner wall defining a longitudinal axis extending from the first end to the second end, the interior passage open at the first end and open at the second end such that an end of the cable is capable of being inserted into the first end, pushed through the interior passage, and pushed out the second end;

a roller mounted within the interior passage, the cable capable of rolling along the roller as the cable is pushed through the interior passage;

a wedge sliding within the body to a position adjacent the roller, the wedge capable of clamping the cable between the roller and the wedge; and at least one guide having an inclined planar surface extending from the inner wall of the elongate body, the guide directing the cable between the roller and the wedge, wherein tension in the cable in one direction causes the wedge to slide away from the roller, thus permitting the apparatus to be slid along the cable to a desired location, and wherein tension in the cable in the opposite direction causes the wedge to slide to the roller, thus clamping the cable within the apparatus.

2. An apparatus according to claim 1, wherein the wedge has a serrated surface to enhance frictional grip of the cable.

3. An apparatus according to claim 1, wherein the roller has a cylindrical outer surface.

4. An apparatus according to claim 1, wherein the roller rotates about an axis of rotation, the axis of rotation perpendicularly arranged to the longitudinal axis of the elongate body.

5. An apparatus according to claim 1, wherein the roller rotates about an axis of rotation, the axis of rotation aligned along the longitudinal axis of the elongate body.

6. An apparatus according to claim 1, wherein the body comprises at least one slot in an outer surface thereof, and the wedge slides along the slot.

7. An apparatus according to claim 1, further comprising a guide to help deliver the cable to the roller as the cable is inserted into the first end and pushed through the interior passage.

8. An apparatus according to claim 1, further comprising a hanger mounted to the body.

9. A method for clamping a cable, comprising:

inserting an end of the cable into a single piece clamp, the single piece clamp comprising a roller and a sliding wedge; and hanging the single piece clamp to create tension in the cable, the tension causing the wedge to slide to a position adjacent the roller and to clamp the cable between the roller and the wedge.

10. An apparatus according to claim 1, wherein the at least one guide extends from the inner wall of the elongate body and toward the roller, the guide directing the cable to the roller.

11. An apparatus according to claim 1, wherein the at least one guide extends from the inner wall of the elongate body and toward the wedge, the guide directing the cable to the wedge.

12. An apparatus according to claim 1, wherein the at least one guide is positioned proximate the first end of the elongate body, the at least one guide extending from the inner wall of the elongate body toward the roller, the guide directing the cable to the roller.

13. An apparatus according to claim 1, wherein the at least one guide extends from the inner wall of the elongate body and toward the longitudinal axis of the elongate body.

* * * * *